Aug. 24, 1965  E. I. VALYI  3,201,858
METHOD OF MAKING A COMPOSITE POROUS METAL STRUCTURE
Filed June 14, 1962 2 Sheets-Sheet 1
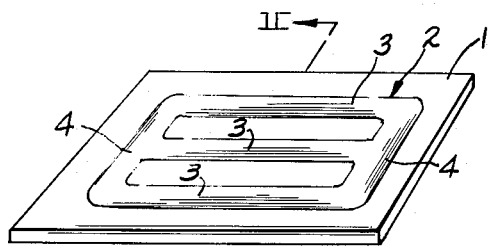
FIG-1
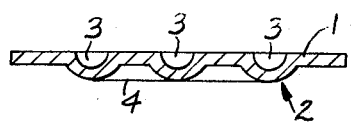
FIG-2
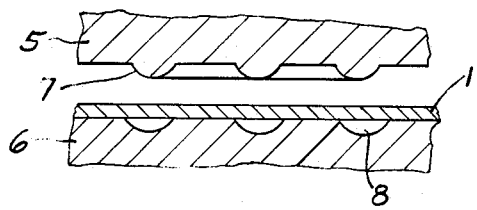
FIG-3
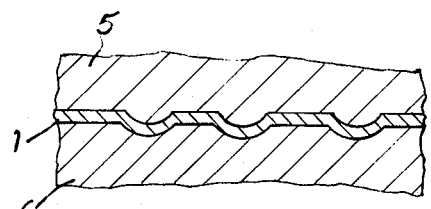
FIG-4
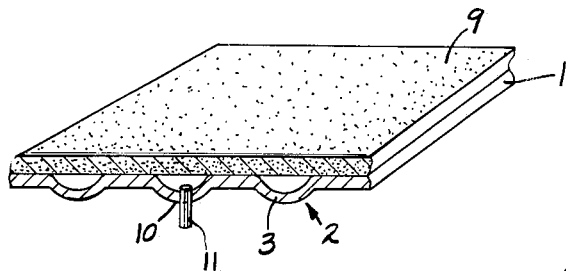
FIG-5
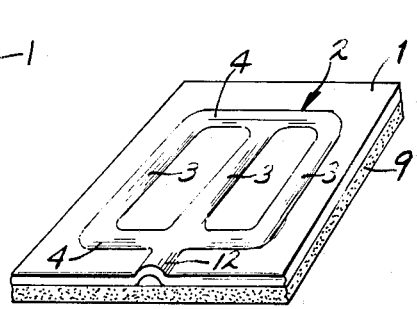
FIG-6
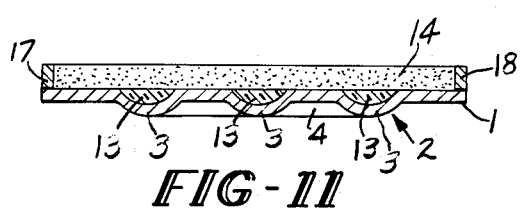
FIG-11
FIG-12
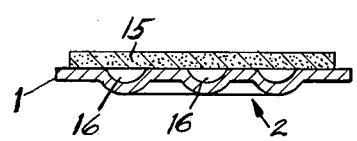
FIG-13
INVENTOR.
EMERY I. VALYI
BY
Robert H. Bachman
ATTORNEY Aug. 24, 1965    E. I. VALYI    3,201,858
METHOD OF MAKING A COMPOSITE POROUS METAL STRUCTURE
Filed June 14, 1962    2 Sheets-Sheet 2

INVENTOR.
EMERY I. VALYI
BY Robert H. Bachman
ATTORNEY

United States Patent Office 3,201,858
Patented Aug. 24, 1965

3,201,858
METHOD OF MAKING A COMPOSITE
POROUS METAL STRUCTURE
Emery I. Valyi, Riverdale, N.Y., assignor to Olin Mathieson Chemical Corporation, a corporation of Virginia
Filed June 14, 1962, Ser. No. 202,612
15 Claims. (Cl. 29—157.3)

This application is a continuation in part of co-pending application Serial No. 732,663 filed May 2, 1958, now U.S. Patent 3,049,795, which in turn is a continuation in part of co-pending application Serial No. 586,259 filed May 21, 1956, now abandoned.

This invention relates to porous fabrications, and more particularly to a permeable body integrated to a supporting sheet metal structure adapted to conduct a fluid to the said permeable body for flow and distribution therethrough.

As brought out in the aforesaid co-pending applications, the subject matter thereof was directed to novel features wherein a permeable body formed of powdered metal is joined to a supporting metal structure so as to become integral therewith in all areas except where they are formed between the permeable and impervious portions of the structure.

The resultant porous fabrication may be utilized advantageously in various applications. For example, it may be employed in the subsequent manufacture of gas burners that are intended to provide evenly distributed heat over large surfaces. In such application a combustible gas is distributed by the fluid channels to different portions of the permeable body through which it flows to emanate on the combustion side thereof substantially uniformly over most of the surface of that body at a substantially uniform rate, thus producing a flame blanket. The resultant porous fabrication may also be utilized advantageously in the construction of evaporative coolers whereby an efficient cooling surface is obtained by using the porous metal body as a means through which to distribute over a large area the liquid which is to evaporate for the purposes of transpiration cooling. In a further application, the porous fabrication may be utilized in the construction of filters wherein the porous metal body provides a controlled porosity and permeability so as to enable a liquid carrier to filter through the porous metal body while leaving filtrate on the other side thereof. As will be recognized, one of the most important limitations restricting the use of porous fabrications resides in the fact that it is very difficult and costly to provide conduits which conduct fluids efficiently to the appropriate faces or portions of the porous metal bodies, and therefrom to be distributed into and through such porous metal bodies for the purposes of combustion, evaporation, filtration, or other purposes. Another limitation of porous metal bodies restricting their use in components designed to transfer heat from one medium to another derives from the fact that the heat conduction of such porous bodies is less than that of solid metal bodies and that it is difficult and costly to effect efficient heat transfer to the porous bodies and through them. While the techniques and methods of producing pervious or porous bodies from powder metal have been extensively discussed in the literature such as for example in "Powder Metallurgy" by Dr. Paul Schwarzkopf (the MacMillan Company, New York, 1947) and "Powder Metallurgy" edited by John Wulff (the American Society for Metals, Cleveland, 1942) no economical and efficient method has been found thus far to overcome the limitations above referred to prior to the invention described in the aforesaid co-pending applications; the basic concept of the contribution therein comprises the forming of an integral structure of two or more metal layers of differing characteristics, of which at least one layer is porous and pervious to fluids, such as gases or liquids, and the others impervious and solid, these layers being secured together, preferably through a sintering operation, although brazing and other means may also be employed, so as to enable the formation of fluid channels in predetermined portions between the confronting faces of various layers comprising the integrated porous structure.

In accordance with the disclosure of the aforesaid co-pending applications, the porous fabrication is formed from a supporting sheet metal member which may have all or a portion thereof in the form of a flat, relatively thin plate, sheet, or strip. A pattern of weld-inhibiting material is applied to this member in a design corresponding to that desired for the fluid conducting channels which are to be provided in the ultimate structure. Following the application of the weld-inhibiting material, a substantial layer of powdered metal aggregate is deposited upon the plate thus treated. Subsequent thereto this composite structure may be subjected to pressure to compact the powdered metal and to press it firmly against the solid plate. This compacted assembly is then exposed to a suitable sintering temperature under conditions preventing undesired reactions, such as oxidation of the metal. This sintering operation accomplishes the sintering of the powdered metal particles to each other together with the metallurgical bonding, welding, of the sintered metal aggregate to the solid member.

In an alternate method disclosed in the foregoing co-pending application, the powder metal layer may be separately formed by known powder metallurgy techniques. In this method the solid sheet metal member may be first prepared by applying a pattern of weld-inhibiting material to the portions thereof at which the fluid channels are to be formed, and applying to one side of the porous metal layer a suitable thin layer of soldering or brazing metal. The porous metal layer is then superimposed upon the solid plate so as to sandwich the weld-inhibiting material between them, and the composite subjected to a thermal treatment to accomplish the brazing or soldering of the porous metal layer to the sheet metal member in all adjacent areas thereof except in those portions separated by the weld-inhibiting material.

The resultant composite structure may now be adapted for the conducting of fluids by deforming or flexing those portions of the sheet metal member, which are disposed opposite the weld-inhibiting material, away from the porous metal layer. This can be accomplished for example by introducing a fluid under pressure into the ununited portions of the composite structure formed between the porous layer and a sheet metal member, or mechanically, by insertion of suitable mandrels into these areas. This deformation of the sheet metal member away from the porous metal layer will form fluid channels defined on one side by an impervious metal wall portion and on the other side by the porous metal.

As will be understood, various combinations of materials may be utilized in forming the integrated composite structure; and accordingly the solid sheet metal member and the porous layer or body may be of the same metal or alloy, or the porous structure and the solid member, of the integrated structure, may be comprised of different compositions. For example, both the porous metal layer and a solid sheet metal member may be formed of the same stainless steels, coppers, brass, carbon steels, aluminum or various combinations thereof. As will be understood the ultimate use of the resultant integrated structure determines the specific combination of alloys to be employed.

Accordingly, among the objects of this invention is to provide a novel method for making porous metal structures adapted to distribute a fluid and heat in flow therethrough.

Other objects and advantages of this invention will become more apparent from the following drawings and description in which FIGURES 1 to 6 illustrate various steps in the practice of one embodiment of this invention;

FIGURES 11 to 13 illustrate various stages of a further embodiment of this invention.

Figure 7:
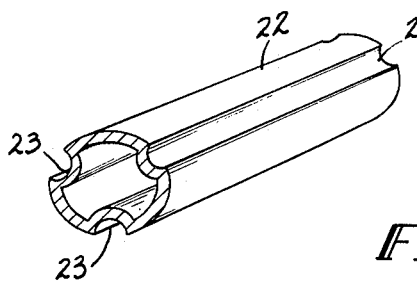
FIGURES 7 to 10 illustrate various stages in practicing another embodiment of this invention.
Figure 8:
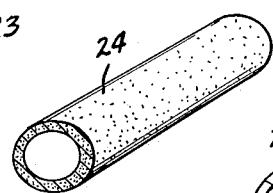
Figure 9:
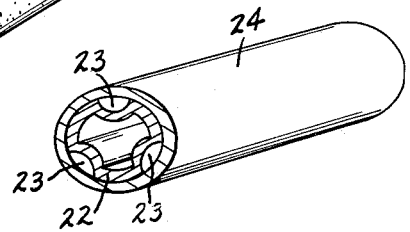

Referring to the drawings FIGURES 1 to 5 are illustrative of one embodiment of this invention wherein a metal sheet 1 is suitably embossed at 2 in a pattern corresponding to a desired system of fluid channels desired for the distribution of a fluid in the ultimate structure. For example the embossment may comprise a plurality of coextending tubes 3 interconnected at each adjacent ends by a transversely extending portion of header 4. However, it is to be understood that although a simple pattern has been illustrated, it may nevertheless be of any configuration and of any degree of intricacy. In addition the embossment may be provided in accordance with any of the conventional practices known in the art, for example they may be formed between a pair of complementary dies 5 and 6 which are mounted in operative relationship to conventional reciprocating presses, not shown, such as normally used for punching or embossing. In the usual manner, when dies 5 and 6 are closed against sheet 1, a pattern corresponding to the die impressions 7 and 8 will be impressed in strip 1. It is noted that the conditioning of strip 1, embossing, may also be accomplished in a continuous manner, for example, the strip 1 may be continuously fed between a pair of rolls having their cooperating surfaces machined to a pattern corresponding to a desired die impression such as that shown for the aforedescribed dies 5 and 6. Subsequent to the provision of the desired embossments in metal sheet 1, a sheet-like preform body of sintered porous metal 9 is superimposed on sheet 1 so as to dispose the groove-like indentations of the embossments in extention away from the sintered porous body 9.

In this manner these groove-like indentations will protrude out of an external face of the assembly. Subsequently, the embossed sheet metal member 1 suitably unified to the superimposed porous body along the unembossed portions of sheet metal member 1, as for example in accordance with the above discussion of the disclosures contained in the aforesaid co-pending application. In such manner the unification may be accomplished by thermal treatment to obtain a molecular bond between sheet metal member 1 and the porous metal body 9, or suitable brazing or soldering material may be coated on and along the unembossed portions of sheet metal member 1, followed by conventional thermal treatment to accomplish the desired unification between these components.

In regard to production of the porous body, it may be obtained by the so called gravity sintering method which comprises a process wherein graded metal powder, frequently spherical metal powder, is poured by gravity into an appropriately shaped confined space, and usually vibrated to cause it to compact uniformly. As is obvious the choice of particle size of the metal powder will largely determine the amount of porosity, i.e., void space. The metal powder or aggregate so packed is then sintered in accordance with well-known powder metallurgy practices, producing a porous metal body whose bulk density, or apparent density, is but a fraction of the density of the metal or alloy from which the powder particles are obtained. Generally the conditions of vibration and conditions of sintering are chosen to result in an apparent density of approximately 25% to 75% of the solid density of the corresponding alloys. In another procedure for the production of such porous metal bodies the process may comprise blending intimately a graded metal powder with a combustible substance, such as for example wood flour or other organic particulate material, or a soluble material whose melting point exceeds the sintering temperature of the metal powder. After the formulation of this dry blend, the mixture of metal powder and combustible or soluble substance is then compacted under pressure, such as by rolling resulting in a body that has no voids and is reasonably firm, sufficient for handling. This body is then sintered in accordance with well-known powder metallurgy practices to produce a cohesive structure in which the metal particles are sintered together at their respective points of contact and the combustible or soluble material remains unbonded to the metal particles forming discrete islands within the metal body. Upon completion of the sintering operation and if the non-metallic component is combustible, then the resultant body will in fact contain void spaces everywhere previously occupied by the combustible material since the latter will have burned away in the course of sintering. In the case utilizing a soluble material whose melting point is higher than the sintering temperatures of the metal, the soluble material will remain intact after the final stages of sintering and can be subsequently removed by leaching and dissolving with a liquid, resulting in a network of interconnected pores.

In the modification of the foregoing it is noted the above described dry blend of metal powder and combustible or soluble substance may be replaced, respectively, by a paste of slurry obtained by suspending the admixed powder metal and combustible or soluble particles in a suitable liquid vehicle, as for example water or alcohol; or in applications where the combustible substance is mostly organic, by choosing a combustible substance that is a viscous liquid instead of being particulate such as for example a liquid phenolic resin. Alternately the mixture of metal powder and void or pore forming substance and vehicle, or void or pore forming substance alone, may be prepared into a paste which may be brought into the desired shape by pressing or extrusion.

A further method of producing the sintered porous metal bodies comprises melting a metal or alloy and casting it into the interstices of a porous aggregate of a particulate soluble material whose melting point exceeds that of the metal. Upon solidification of the metal, a component is produced which contains the network of the soluble material interspersed within the solid metal which soluble material is thereupon removed by leaching or dissolving, leaving behind it interstices that interconnect and form a porous network within the resultant metal body. Soluble substances contemplated for these purposes, be it for blending with solid metal powder or for the above casting process, comprise sodium chloride in conjunction with aluminum and aluminum alloys, aluminum fluoride in conjunction with copper alloys, and calcium oxide in conjunction with alloys having melting points higher than copper alloys. As will be understood other substances, particularly inorganic salts, are readily available and known to the art for such purpose as for example various phosphates, such as tri-sodium phosphate.

A still further method of producing a porous metal body comprises weaving or knitting metal wire into a mesh arranged in a plurality of layers. According to this process, a control of porosity is obtained by appropriate choice of wire diameters and openings arranged between adjoining wires as well as the juxtapositioning of superimposed layers of the woven or knit mesh.

After joining and unifying the embossed sheet metal member and the porous body, the resultant integrated composite structure may be adapted for receiving a fluid by forming an opening 10 through the wall in any of the groove-like indentations followed by the insertion of a suitable inlet conduit 11 which may in turn be connected to a source of fluid, such as a combustible gas.

In addition the sintered integrated composite structure may be adapted for receiving a fluid by modification of the pattern of embossments 2 by providing to the embossments an extension thereof 12 which may be included so as to terminate at an edge of the unit either with or without trimming thereof. As in the preceding embodiment, in this modification a similar inlet conduit may be fitted into the terminal opening of extension 12.

FIGURES 11 to 13 illustrate an embodiment of this invention in which the formation of the sintered porous body is accomplished simultaneously with its integration to a sheet metal solid member to obtain the desired structure of this invention. As in the preceding embodiment a sheet metal member 1 may be embossed to provide a pattern 2 of groove-like indentations comprised of coextending grooves 3 interconnected at opposite ends by a transversely extending groove or header 4. However, in order to adapt this embodiment for the superimpositioning of a mass of particulate metal, the grooves of the pattern of embossments 2 are filled with a spacer or supporting material 13 which is adapted to be readily removed by combustion or by solution. This spacer or supporting material may be in loose particulate form, or comprise a paste prepared from sodium chloride and water or a paste prepared from an organic lacquer or adhesive and a filler substance, such as siliceous sand. This spacer material may be applied directly into only the grooves of the embossments, or indiscriminately over the entire face of the embossed sheet metal member 1 followed by subsequent wiping off of the spacer material from the unembossed portions of sheet metal member 1 flush with the top of the grooves thereby leaving the spacer substance within the channels. Thereafter, a mass of particulate metal powder 14 is applied on sheet metal member 1 whereon it may be suitably compacted by vibration or by pressure with its configuration controlled by retaining walls 17 and 18 which also serve to contain the metal powder on sheet metal member 1 during compaction and subsequent operations.

Although a specific mass of sinterable metal has been described, it is pointed out that other formulations of sinterable materials may also be used, as for example those metal oxides, carbides and nitrides, or mixtures thereof, containing if necessary pore or interstice forming materials discussed above. The unification of various components of this embodiment may be accomplished by sintering at temperatures sufficient to sinter the particulate substance within itself and to the unembossed portions of sheet metal member 1, in other words in all regions in which the two bodies are in contact, whereby no unification occurs in the regions represented by the grooves which are filled with the spacer or supporting substance 13. In modifications wherein the spacer or supporting substance comprises a combustible material or binder such combustible material will burn away during the sintering operation to provide fluid channels 16 defined between the sintered porous metal body 15 and the grooves of sheet metal member 1. However, where the spacer or supporting substance 13 comprises a liquid soluble material, such as sodium chloride indicated above, this spacer or supporting substance may be removed following the sintering operation by leaching or dissolution of the soluble material in an appropriate liquid vehicle or solvent such as for example the dissolution of sodium chloride in water. Also as will be readily understood where the spacer or supporting substance 13 and the formulations of particulate metal aggregates comprise the inclusion of combustible and liquid soluble materials the eliminations of these included materials can be accomplished simultaneously where these included materials are of the same nature.

Various substances are known to be effective in preventing adhesion of one metal body to another, even under severe pressure, as in rolling, at elevated temperatures, as in the course of soaking prior to rolling, or diffusion-annealing, etc. In fact, many substances present in metal as accidental impurities, as for example manganese sulphide in steel, operate to produce seams and other discontinuities in rolled products. Among these substances are graphite, applied for example in the form of colloidal suspensions, boron nitride, talcum, zinc oxide, titania, and many others, each within certain limits of applicability that are not relevant here. In fact, it has been noted that on occasion during roll-welding of two superimposed sheets interference with the integration occurs even by the mere presence of an accidental oil smudge on the surfaces of the sheets. For purposes of the present invention, the separation or weld-inhibiting materials employed need not withstand exposure to high pressures or be capable of extending under pressure which normally are requisites of stop-weld resist used in pressure welding. Instead, the weld-inhibiting material employed as the spacer or supporting substance herein need only have reasonable mechanical strength to function as a spacer or support before the superimposed particulate material acquires strength of its own as the sintering operation progresses. The weld-inhibiting material employed as a spacer or supporting substance should preferably be capable of being applied at room temperature as a powder or by spraying, painting, extrusion, etc.; if needed, harden with the least time delay, and remain in place through the better part of the subsequent operations which usually comprise the application of a loose particulate metal layer of transporting the composite preparatory to a sintering operation and of sintering. Moreover, this spacer or supporting substance must be capable of removal following the sintering operation even if the channel network is extremely complex and tortuous.

Preferably the spacer or supporting substances contemplated herein are liquid soluble and have a melting point higher than the sintering temperature of the particulate metal layer, or at least higher than the temperature at which that layer commences to acquire reasonable mechanical strength in the course of sintering. Such soluble substances are for example sodium chloride, which melts at 801° C., a temperature somewhat below the customary sintering temperature of copper; and it may be used in connection with copper aggregate because the latter will acquire adequate strength during sintering before the sodium chloride begins to melt. Other such soluble substances are sodium aluminate (melting at 1650° C.), potassium sulphate (melting at 1076° C.), sodium metasilicate (melting at 1088° C.), aluminum chloride (melting at 1040° C.), and others. The choice of such soluble spacer or supporting substances will of course also depend on possible solid phase reactions with the metal surrounding them, at the temperatures of sintering. For example, while one of the most effective weld-inhibiting materials adapted for use as the spacer or supporting substance in connection with copper and aluminum alloys is graphite or carbon, austenitic stainless steel would be harmed by that spacer substance through carburizing.

In this respect it is pointed out that also contemplated within this invention is the utilization of a specific form of a carbon as a weld-inhibiting material in the fabrication of these composite structures. The particular form of carbon contemplated is that obtained in situ, from organic substances, by pyrolysis. As is known, progressive elevated temperature exposure of a variety of organic substances in inert or reducing atmospheres results in progressive thermal degradation of the organic material and ultimately in pyrolysis similar to coking. The residual carbonaceous matter is strong and cohesive as well as stable, except under oxidizing conditions at elevated temperatures. The resultant weld-inhibiting material, originally introduced as an organic substance may thus maintain reasonable mechanical strength and its functional integrity not only at room temperature but also throughout the process of heating during the sintering operation, while the powder metal acquires appreciable strength and ability to support itself over a preformed channel forming the groove of the desired composite structure. However, the organic material applied to the solid metal surface or within the preformed channel of a solid metal member, may be used as a weld-inhibiting material only if the carbonaceous residue remaining after the sintering operation is removable. This in turn depends upon the particular metal aggregate applied above it which must be pervious and porous enough to permit the ambient atmosphere to react freely with the contents of the channels. In such a case, the pyrolized organic substance will break down further and oxidize without residue, if the sintering furnace atmosphere is adjusted to allow for progressive formation of gaseous carbon compounds, or, as is preferable, if exposed to air while still hot enough to oxidize vigorously.

For example, in any of the embossed grooves above described, they may be filled with a paste-like mixture of silica sand and a phenolic varnish of the resol type. The weld-inhibiting materials so formed can be hardened at room temperature and then upon exposure to increasing temperatures, will progressively harden and cure as is naturally expected for a phenolic resin, and thereafter progress through several stages of heat degradation while heated to still higher temperatures in an inert atmosphere. In a specific application in which sperical copper particles were metallurgically bonded to a copper sheet, during the course of the sintering operation the sand particles remained bonded together due to the carbonaceous residue of the phenolic resin. Upon removal of the sintered composite from the furnace and while still at an elevated temperature approaching that of the furnace, but now exposed to ambient air, the carbon almost instantaneously leaving the sand free flowing and devoid of any bond.

Oxidation of the pyrolyzed residue may be accomplished usually by mere exposure to an atmosphere containing sufficient oxygen to burn the carbon, but not enough to oxidize the metal harmfully. In the case of copper, sintering may be followed by air exposure at room temperature, as above described; in the case of stainless steels, if brightness is to be preserved, cooling after sintering may take place in a protective atmosphere which may have just enough oxygen to react with the carbon. A wide variety of such weld-inhibiting spacer and supporting substances are readily available and known to the art; and in principle such formulations usually consist of free flowing comparatively inert granular materials, such as silica sand, bonded with phenol formaldehyde, urea-formaldehyde, polystyrene, polyethylene, furfural formaldehyde, coal tar, etc., or such organic materials alone and others, for example, paper, adhesive tape, etc., in the event that only thin films need to be applied prior to sintering.

Figure 10:
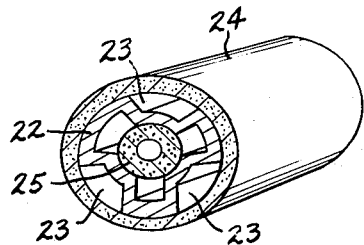

FIGURES 7 to 10 show various applications of this invention to the embodiments comprising tubular structures fabricated in a plurality of alternate manners. For example the tubular structure 22 may comprise a seamless cylinder appropriately embossed to define groove-like indentations 23 corresponding to the particular design of fluid channels desired. Thereafter the tubular structure may have a sintered porous metal body integrated thereto in accordance with any of the foregoing embodiments of this invention. For example, a hollow cylindrical preform 24 of sintered porous metal may be formed, and in to which is inserted the tubular structure 23 followed by appropriate joining of the two components together in accordance with any of the foregoing. As can be seen in FIGURE 10 such a structure may be formed to provide a sintered porous metal body on the interior and exterior of the structure. In this embodiment an additional hollow cylindrical preform 25 is provided of a dimension adapted to fit it within the interior of the tubular structure 22 so as to contact the crest 26 of the bulges extending into the interior of the structure. In the embodiment illustrated the crest of the bulges may be suitably shaped into arcuate configuration to adapt them to cradle the second preform 25. In this embodiment a plurality of fluid channels is formed in the wall of the tubular structure between respective sintered porous metal bodies integrated thereto. However, it is to be understood that although a simple configuration of embossments has been illustrated, the configuration may be of any degree of complexity, for example the embossments may comprise an axially extending groove-like indentation, circumferentially extending groove-like indentations, or a combination of the two, as for example the pattern of groove-like indentations spirally winding about the cylindrical structure 22.

As will be understood, the selection of materials from which the porous and solid components are made to comprise the structures described herein and in the co-pending application, is based on considerations within the skill of persons acquainted with mechanical, physical and chemical properties of materials. While the structures described herein have been identified as being metallic on numerous occasions, it is pointed out that all or parts of these structures may be made of non-metallic materials, as called for by their intended use. Thus, the porous layer may incorporate catalysts, as pointed out in the co-pending application, which catalysts may be non-metallic. The porous layer may also consist in part or entirely of glasses, carbides, nitrides, oxides or borides, for example in instances calling for heat resistance, corrosion resistance or insulating properties not available in metals and alloys. The porous layer may also consist of synthetic polymeric substances, for similar reasons, as for example sintered porous fluoro-carbon resins, silicone resins, and others. The solid component is usually made of metal strip or plate which may be coated with non-metallic materials of the kind referred to. In instances not calling for high strength the solid component may also be made of synthetic resins made into strip, sheet or plate stock.

Several of the embodiments described herein may be made advantageously of non-metallic components. Thus, a component intended to distribute highly corrosive inorganic acid vapors may be made of fluorocarbon resins; another intended to serve as diffuser of combustible gas also acting as a radiant burner may be made in part of silicone carbide. Other examples are obvious to those skilled in the art of constructing components to be used in environments of high temperature and corrosive attack.

It will be understood that the porous layer referred to herein may be produced in still additional ways either in situ, upon the surface of a solid component or separately, to be joined thereto. Thus, the porous component may be produced by mechanical perforation of a solid metallic sheet, however, such a method would generally be expensive and cumbersome. The porous layer may also be produced by spraying of metal by techniques well-known to those skilled in the metal working art and carried out either with a wire gun or a powder gun, whereby, through appropriate and well-known adjustment of the spray gun, the spraying process may be directed so as to produce a porous sprayed deposit. A porous sprayed deposit may also be produced with a powder gun by spraying along with the material intended to form the porous layer and intimately intermingled with it an evanescent solid which will be deposited along with the rest of the sprayed material and which may then be removed from the porous composite by leaching as described in previous examples. However, this procedure of producing the porous layer by spraying is also cumbersome and expensive in most instances, compared to the other means described herein and in the co-pending applications.

Although the invention has been described with reference to specific embodiments, materials and details, various modifications and changes, within the scope of this invention, will be apparent to one skilled in the art and are contemplated to be embraced within the invention.

What is claimed is:

1. A method of making a sheet-like porous metal structure comprising embossing a sheet metal member of tubular cross-section to form groove-like indentations therein protruding out of one face of said member radially extending toward the interior of said member, providing a sheet-like porous metal body, superimposing said body on the opposite face of said member, and metallurgically bonding said body to the unembossed portions of said member whereby said indentations form channels for flow of fluid therethrough.

2. The method of claim 1 wherein said body is a tube-like sheet coextending within peripheral surfaces of said member.

3. The method of claim 1 including the step of superimposing a second sheet-like porous metal body on the first said face of said member in abutment with the crest of the protrusions extending out of the first said face and metallurgically bonding said second body to said crest.

4. The method of claim 1 wherein said member is embossed to provide a plurality of interconnected groove-like indentations.

5. A method of making a porous metal structure comprising embossing a sheet metal blank to provide groove-like indentations extending out of one face of said blank, forming said blank into a tube-like structure enveloping said face, superimposing a rigid porous metal layer on the external face of said tube and metallurgically bonding said layer to the unembossed portions of said external face.

6. The method of claim 5 wherein said blank is embossed to provide a plurality of interconnected groove-like indentations.

7. A method of making a sheet-like porous metal structure comprising embossing a sheet metal member to form groove-like indentations therein protruding out of one face of said member, filling said indentations with an evanescent material, providing a layer of metallic particles on the face of said structure opposite said one face, metallurgically bonding by sintering said particles to each other and to the unembossed portions of said oppostie face and eliminating said material.

8. The method of claim 7 wherein said evanescent material comprises a substance combustible at sintering temperatures.

9. The method of claim 7 wherein said material comprises a substance having a higher melting point than said metallic particles with said substance being soluble in a liquid, and wherein said elimination comprises dissolution of said material in a liquid.

10. The method of claim 9 wherein said substance is water soluble.

11. The method of claim 10 wherein said substance comprises sodium chloride.

12. The method of claim 10 wherein said substance comprises a phosphate.

13. The method of claim 7 wherein said structure is of tubular configuration.

14. The method of claim 13 wherein said material comprises a substance combustible at sintering temperatures.

15. The method of claim 13 wherein said material comprises a substance having a higher melting point than said metallic particles with said substance being liquid soluble, and wherein said elimantion comprises dissolution of said substance in a liquid.

References Cited by the Examiner

UNITED STATES PATENTS

| | | | |
|---|---|---|---|
| 2,239,800 | 4/41 | Vogt et al. | |
| 2,386,746 | 10/45 | Hess | 158—96 |
| 2,544,408 | 3/51 | Whitney et al. | 126—362 |
| 2,663,928 | 12/53 | Wheeler. | |
| 2,667,427 | 1/54 | Nolte | 29—492 X |
| 2,695,230 | 11/54 | Haller | 75—222 X |
| 2,695,231 | 11/54 | Causley | 75—222 X |
| 2,712,352 | 7/55 | Manor et al. | 158—28 |
| 2,739,375 | 3/56 | Coxe | 29—472.7 |
| 2,826,559 | 3/58 | Updegraff et al. | 260—38 |
| 2,836,884 | 6/58 | Graham | 29—423 |
| 2,908,455 | 10/59 | Hoadley | 244—117 |
| 2,941,759 | 6/60 | Rice et al. | 244—117 |
| 2,948,277 | 8/60 | Dennis | 126—362 |
| 2,981,520 | 4/61 | Chadburn | 165—170 |
| 3,020,254 | 2/62 | Less et al. | 260—38 |
| 3,053,514 | 9/62 | Grenell | 165—170 |
| 3,065,532 | 11/62 | Sachse | 29—470 |
| 3,091,027 | 5/63 | Clair | 29—472.7 |
| 3,135,044 | 6/64 | Mote et al. | 29—423 |
| 3,138,856 | 6/64 | Kuchek | 74—20 X |
| 3,138,857 | 6/64 | Kuchek | 74—20 X |

OTHER REFERENCES

Polonsky et al.: Lightweight Cellular Metal Transactions of American Foundryman's Society, vol. 69 (1961), pgs. 65–79; (Foam Digest) Literature; (Call No. TS200 A 752).

Campbell, J. B., "Pourous Metal Sheet," Materials and Methods; April 1955.

JOHN F. CAMPBELL, *Primary Examiner.*

CHARLES SUKALO, WHITMORE A. WILTZ,
*Examiners.*

UNITED STATES PATENT OFFICE
CERTIFICATE OF CORRECTION

Patent No. 3,201,858

August 24, 1965

Emery L. Valyi

It is hereby certified that error appears in the above numbered patent requiring correction and that the said Letters Patent should read as corrected below.

Column 7, line 35, after "carbon" insert -- oxidizing --; column 9, line 49, for "oppostie" read -- opposite --; column 10, line 17, for "elimantion" read -- elimination --.

Signed and sealed this 31st day of May 1966.

(SEAL)
Attest:

ERNEST W. SWIDER
Attesting Officer

EDWARD J. BRENNER
Commissioner of Patents